US007744995B2

(12) United States Patent
Templeman

(10) Patent No.: US 7,744,995 B2
(45) Date of Patent: Jun. 29, 2010

(54) MULTI-LAYER COATINGS FOR SUBSTRATES

(75) Inventor: Cynthia Gazepis Templeman, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 84 days.

(21) Appl. No.: 11/958,676

(22) Filed: Dec. 18, 2007

(65) Prior Publication Data

US 2009/0155572 A1 Jun. 18, 2009

(51) Int. Cl.
*B32B 5/30* (2006.01)

(52) U.S. Cl. ....................... 428/328; 428/689; 428/457; 428/469

(58) Field of Classification Search ................ 296/1.08; 428/328, 458, 689
See application file for complete search history.

(56) References Cited

U.S. PATENT DOCUMENTS 5,066,733 A 11/1991 Martz et al.
5,342,888 A 8/1994 Sudo
5,374,682 A 12/1994 Gouda et al.
5,609,918 A 3/1997 Yamaguchi et al.
5,684,083 A 11/1997 Temple et al.
5,821,314 A 10/1998 Ikushima et al.
6,335,057 B1 1/2002 Noura et al.
2004/0097662 A1 5/2004 Gaggar et al.
2005/0222324 A1 10/2005 Nakaoka et al.
2006/0175855 A1 * 8/2006 Yamamoto ................ 296/1.08

FOREIGN PATENT DOCUMENTS

JP 11-106686 * 4/1999
JP 2005-152841 * 6/2005

OTHER PUBLICATIONS

JP 11-106686 English machine translation obtained May 5, 2009.*
JP 2005-152841 English machine translation obtained May 5, 2009.*
About.com (http://composite.about.com/library/glossary/a/bldef-a430.htm) obtained May 5, 2009.*

* cited by examiner

*Primary Examiner*—Timothy M Speer
*Assistant Examiner*—Lauren Robinson
(74) *Attorney, Agent, or Firm*—Dinsmore & Shohl LLP

(57) ABSTRACT

A multi-layer coating for application to a substrate including a paint coating layer, a metallic coating layer, and a clear coating layer. The metallic coating layer includes chromium metallic flake pigment. The multi-layer coating may be resistant to discoloration in acids including, without limitation hydrofluoric acid, sulfuric acid, phosphoric acid and combinations thereof.

10 Claims, 1 Drawing Sheet

MULTI-LAYER COATINGS FOR SUBSTRATES

TECHNICAL FIELD

The present invention relates to multi-layer coatings for substrates and, more specifically, to multi-layer coatings for application to vehicle wheels that are resistant to discoloration when exposed to an acid solution.

BACKGROUND

Throughout the years there have been many attempts to prepare coatings and multi-layer coatings for substrates that are resistant to discoloration and/or corrosion under certain circumstances. Of particular interest are coatings and multi-layer coatings for metal substrates that are subjected to harsh environments and ultimately cleaning solutions, such as motor vehicle wheels. In particular, motor vehicle wheels are subjected to road and environmental conditions and are often cleaned with acidic cleaning solutions. Accordingly, coatings for motor vehicle wheels that are resistant to corrosion and discoloration caused by environmental factors and/or cleaning solutions are desired.

The use of coatings containing aluminum flake pigments for application to motor vehicle wheels is generally known in the art. Particularly, the aluminum flake pigment gives the coated vehicle wheel a shiny, metallic appearance that is desired by consumers. However, vehicle wheels having coatings with aluminum flake pigments, particularly those having aluminum flake pigments produced by physical vapor deposition, may be susceptible to discoloration when exposed to acidic solutions. The aluminum flakes in the coating system react with many acids including those commonly found in wheel cleaning solutions. The acids may dissolve the aluminum flakes in the thin mid-coat causing the black base coat to show through the mid-coat and clear coat thereby discoloring the wheel. The vehicle wheel may become discolored after only a fraction of the aluminum flake pigment is dissolved in the acid. The discoloration of vehicle wheels is a significant problem for automotive original equipment manufacturers (OEM) as the discolored wheels must be replaced at significant cost to the OEM.

Accordingly, a need exists for multi-layer coatings for motor vehicle wheels and other like substrates that are resistant to discoloration in acidic solutions.

SUMMARY

The present invention may include a multi-layer coating for application to a substrate. The multi-layer coating may comprise a paint coating layer, a metallic coating layer comprising chromium metallic flake pigment, and a clear coating layer.

In another exemplary embodiment, the present invention may comprise a wheel having a paint coating layer, a metallic coating layer comprising chromium metallic flake pigment, and a clear coating layer.

In another exemplary embodiment, the present invention may comprise a method of producing a wheel. The method may comprise applying to the wheel, in order, a paint coating layer, a metallic coating layer, and a clear coating layer. The metallic coating layer may comprise chromium metallic flake pigments from about 0.5% to about 2.0% by weight in the metallic coating layer as measured prior to application of the metallic coating to the wheel.

BRIEF DESCRIPTION OF THE DRAWINGS

The following detailed description of specific illustrative embodiments of the present invention may be understood when read in conjunction with the following drawing in which.

DETAILED DESCRIPTION OF THE ILLUSTRATIVE EMBODIMENTS

Figure 1:
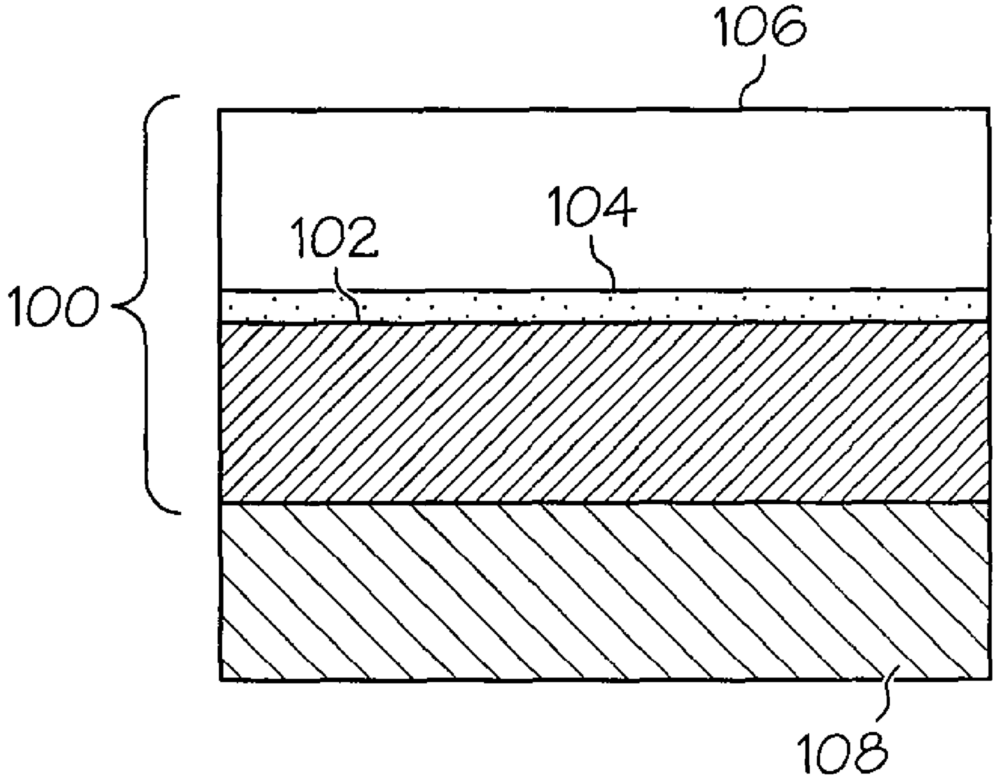
FIG. 1 is schematic of a cross section of a multi-layer coating applied to a substrate in accordance with one exemplary embodiment of the present invention.

FIG. 1 shows a multi-layer coating 100 in accordance with one exemplary embodiment of the present invention. The multi-layer coating 100, illustrated as being applied to a substrate 108, may comprise a paint coating layer 102, a metallic coating layer 104, and a clear coating layer 106. The multi-layer coating 100 may be discoloration resistant in acidic solutions. The multi-layer coating and each of these layers will be described more fully herein.

Referring to FIG. 1, a multi-layer coating 100 in accordance with one exemplary embodiment of the present invention is shown as applied to a substrate 108. The application of the coating 100 is not limited to any particular substrate material and may be readily applied to substrates formed from metals, plastics or any other suitable material. The multi-layer coating may be applied to substrates used for a variety of applications including, without limitation, motor vehicles and motor vehicle components, appliances, motorcycles, bicycles, and the like, or any other application in which a coating may be applied. In an exemplary embodiment the substrate to which the multi-layer coating is applied may be a wheel, such as a motor vehicle wheel.

Still referring to FIG. 1, the multi-layer coating 100 may comprise a paint coating layer 102, a metallic coating layer 104, and a clear coating layer 106. The paint coating layer 102 may be an acrylic based paint such as Spectracron® SAC High Gloss manufactured by PPG Industries, Inc. The paint coating layer 102 may comprise a pigment. In one exemplary embodiment of the multilayer coating 100 in accordance with the present invention, the paint coating layer 102 may comprise a carbon black solid color pigment. It should be understood that there is no particular limitation as to the paint used in the paint coating layer 102 and that the paint may be selected from any of a variety of known paints, with or without pigment.

The metallic coating layer 104 may comprise a melamine polyester based paint, such as Spectracron® SAC melamine polyester based paint manufactured by PPG Industries Inc., containing a metallic flake pigment. It should be understood that there is no particular limitation as to the paint used in the metallic coating layer and that the paint may be selected from any of a variety of known paints suitable for incorporating a metallic flake pigment.

The metallic flake pigment used in the metallic coating layer 104 may comprise, in one embodiment, metallic flakes from about 15 μm in diameter to about 17 μm in diameter and less than about 1 μm thick. The metallic flakes may be preferably resistant to dissolution in acids such as those commonly found in motor vehicle wheel cleaning solutions including, without limitation, hydrofluoric acid, sulfuric acid, phosphoric acid and combinations thereof. In one exemplary embodiment of the multi-layer coating of the present invention the metallic flake pigment may comprise chromium metallic flakes.

The metallic coating layer 104 may comprise from about 0.5% to about 2.0% by weight of metallic flake pigment as measured prior to the application of the metallic coating layer 104 to the substrate 108. The weight percentage of metallic flake pigment in the coating layer 104 may be selected in the range from about 0.5% to about 2.0% to achieve a desired metallic effect in the applied metallic coating. Weight percentages of metallic flake pigment of around 0.5% may produce a sparkle effect while weight percentages of metallic flake pigment of around 2.0% may produce a uniform, mirror-like effect.

Still referring to FIG. 1, the clear coating layer 106 of the multi-layer coating 100 according to one embodiment of the present invention may be an acrylic based clear paint such as Spectracron® SAC Clearcoat manufactured by PPG Industries, Inc. It should be understood that there is no particular limitation as to the clear paint used in the clear coating layer 106 and that the clear paint may be selected from any of a variety of known clear paints.

In an exemplary embodiment of the multi-layer coating 100 of the present invention shown in FIG. 1, the multi-layer coating 100 may be applied to the substrate such that the paint coating layer 102 is from about 6 μm to about 14 μm thick, the metallic coating layer 104 is from about 1 μm to about 2 μm thick, and the clear coating layer 106 is from about 20 μm to about 45 μm thick. However, it is to be understood that the thickness of each of the paint coating layer 102, metallic coating layer 104, and clear coating layer 106 may be varied depending on the particular application and substrate material to which the multi-layer coating 100 of the present invention is applied. For example, when applied to a substrate such as a vehicle wheel, the paint coating layer 102 may be about 14 μm thick, the metallic coating layer 104 may be about 1 μm thick, and the clear coating layer 108 may be about 20 μm thick.

In an exemplary embodiment, the paint coating layer 102, the metallic coating layer 104, and the clear coating layer 106 may be applied to the substrate in the following order: the paint coating layer 102 may be applied directly to the substrate 108, the metallic coating layer 104 may be applied to the paint coating layer 102 so as to obscure the paint coating layer 102, and the clear coating layer 106 may be applied to the metallic coating layer 104. The paint coating layer 102, the metallic coating layer 104, and the clear coating layer 106 may be spray applied to the substrate. It is to be understood that the individual layers of the multi-layer coating may be applied to the substrate using any of a variety of known techniques for applying coatings to a substrate and there is no particular limitation as to the method by which the individual coating layers may be applied.

As discussed above, wheels having prior art multi-layer coatings with aluminum flake pigments are susceptible to discoloration. Discoloration may occur when the wheel is exposed to an acidic solution, such as when the wheel is cleaned with certain commercially available wheel cleaners, or other environmental conditions. The acidic solution may dissolve the aluminum flake pigment in the prior art coating causing the wheel to discolor. However, as discussed in the following example, multi-layer coatings comprising chromium metallic flake pigment according to the present invention have improved acid resistance (e.g. corrosion resistance) and are more discoloration resistant than other prior art multi-layer coatings.

Example

A test sample was prepared in accordance with an exemplary embodiment of the multi-layer coating of the present invention. The test sample comprised a multi-layer coating applied to the substrate as follows: a paint coating layer comprising a paint with a black pigment was applied to the substrate followed in order by a metallic coating layer comprising 2.0% chromium metallic flake pigment by weight and a clear coating layer.

In order to test the acid and discoloration resistance of the multi-layer coating according to an exemplary embodiment of the present invention, a solution of acids commonly found in commercially available wheel cleaners was applied to the test sample. The acidic solution consisted of 14.0% by weight of phosphoric acid, 2.3% by weight of sulfuric acid, and 1.6% by weight of hydrofluoric acid. The pH of the acidic solution was 2.6. To apply the acidic solution to the test sample, an open ended cylinder was placed over the test sample and the solution was placed inside the cylinder such that the solution was in direct contact with the multi-layer coating. The cylinder was then covered and the test sample and cylinder were then held at an elevated temperature of 80° C. for four hours.

The purpose of the test is to assess the resistance of the multi-layer coating to discoloration in the acidic solution. If the metallic flake pigment dissolves in the acidic solution, the coating will appear discolored because the black paint coating shows through the metallic coating layer where the metallic coating has been dissolved. If the metallic flake pigment does not dissolve the black paint coating will not show through the metallic coating layer and the multi-layer coating will not discolor.

Following the exposure, the multi-layer coating containing chromium metallic flake pigment according to the present invention remained intact and the chromium metallic flake pigment did not dissolve in the acid mixture after four hours of exposure at elevated temperature. Accordingly, the black pigment of the paint coating layer did not show through the metallic coating layer where the acidic solution was applied. As such, the test sample did not display any noticeable discoloration upon application of the acidic solution. Based on this result, the multi-layer coating comprising chromium metallic flake pigment of the present invention is acid and discoloration resistant in the acidic solution.

It is to be understood that the phrase discoloration resistant, as used herein, may mean that the paint coating layer 102 is not visible through the metallic coating layer 104 after the multi-layer coating has been exposed to an acidic solution. Specifically, following application of the acidic solution to the multi-layer coating 100, an observer would be unable to detect the paint coating layer through the metallic coating layer with the unaided eye and, as such, no discoloration would be apparent to the unaided eye.

Alternatively, the phrase discoloration resistant, as used herein, may mean that the metallic flake pigment contained in the metallic coating layer 104 does not dissolve in an acidic solution comprising hydrofluoric acid, sulfuric acid, phosphoric acid, or combinations thereof, such that the paint coating layer 102 would be visible through the metallic coating layer 104. Accordingly, following application of the acidic solution to the multi-layer coating 100, an observer would be unable to detect the paint coating layer 102 through the metallic coating layer 104 with the unaided eye and, as such, no discoloration would be apparent to the unaided eye.

Typical vehicle wheel cleaners generally have hydrofluoric acid, phosphoric acid, sulfuric acid or combinations thereof. Therefore, it should be understood that the phrase acidic solutions, as used herein, may include solutions comprising hydrofluoric acid, phosphoric acid, sulfuric acid, or combinations thereof. The chromium flake pigment of the multi-layer coating comprising chromium metallic flake pigment does not dissolve upon exposure to acids commonly found in commercial wheel cleaning solutions. As such, wheels coated with the multi-layer coating comprising chromium metallic flake pigments of the present invention are resistant to discoloration when such wheel cleaning solutions are applied.

While particular embodiments and aspects of the present invention have been illustrated and described, various other changes and modifications can be made without departing from the spirit and scope of the invention. Moreover, although various inventive aspects have been described, such aspects need not be utilized in combination. It is therefore intended to cover in the appended claims all such changes and modifications that are within the scope of this invention.

What is claimed is:

1. A multi-layer coating for a substrate, the multi-layer coating comprising:

a paint coating having a thickness of 14 microns and comprising an acrylic based paint;

a metallic coating applied over the paint coating, the metallic coating having a thickness of at least 1 micron and comprising a chromium metallic flake pigment that does not dissolve in acidic solutions comprising 14 wt. % phosphoric acid, 2.3 wt. % sulfuric acid and 1.6 wt. % hydrofluoric acid; and a clear coating applied over the metallic coating, the clear coating having a thickness of 20 microns.

2. The multi-layer coating of claim 1 wherein the substrate comprises a wheel.

3. The multi-layer coating of claim 1 wherein the metallic coating comprises chromium metallic flake pigment from about 0.5% to about 2.0% by weight in the metallic coating as measured prior to application of the metallic coating to the substrate.

4. The multi-layer coating of claim 1 wherein the chromium metallic flake pigment comprises chromium metallic flakes from about 15 μm to about 17 μm in diameter and less than about 1 μm thick.

5. The multi-layer coating of claim 1 wherein the metallic coating is from about 1 μm to about 2 μm thick.

6. A wheel having a coating, the coating comprising:

a paint coating comprising an acrylic based paint applied directly to the wheel, the paint coating having a thickness of 14 microns;

a metallic coating applied over the paint coating, the metallic coating having a thickness of at least 1 micron and comprising a chromium metallic flake pigment; and a clear coating applied over the metallic coating and having a thickness of 20 microns, wherein the wheel does not discolor in an acidic solution comprising 14 wt. % phosphoric acid, 2.3 wt. % sulfuric acid and 1.6 wt. % hydrofluoric acid.

7. The wheel of claim 6 wherein the wheel does not discolor in the acidic solution after exposure to the acidic solution at an elevated temperature of 80° C. for four hours.

8. The wheel of claim 6 wherein the metallic coating comprises chromium metallic flake pigment from about 0.5% to about 2.0% by weight in the metallic coating as measured prior to application of the metallic coating to the wheel.

9. The wheel of claim 6 wherein the chromium metallic flake pigment comprises chromium flakes from about 15 μm to about 17 μm in diameter and less than about 1 μm thick.

10. The wheel of claim 9 wherein the metallic coating is from about 1 μm to about 2 μm thick.

* * * * *